March 1, 1949. H. W. BAHLKE 2,463,137
FILTER
Filed Jan. 3, 1946 2 Sheets-Sheet 1

INVENTOR.
Herman W. Bahlke
BY
Zugelter & Zugelter
Atty's.

March 1, 1949. H. W. BAHLKE 2,463,137
FILTER
Filed Jan. 3, 1946 2 Sheets-Sheet 2

INVENTOR.
Herman W. Bahlke
BY
Zugelter & Zugelter
Attys.

Patented Mar. 1, 1949

2,463,137

UNITED STATES PATENT OFFICE 2,463,137

FILTER

Herman W. Bahlke, Cincinnati, Ohio

Application January 3, 1946, Serial No. 638,729

10 Claims. (Cl. 210—183)

This invention relates to a filter for oil or other viscous fluid, and is applicable particularly to the lubricating systems of engines, pumps, and many other types of machines that might be benefitted by the presence of clean lubricant therein at all times.

An object of the invention is to provide an improved filter which may be inexpensively manufactured, and maintained in operating condition with a minimum of expense.

Another object is to provide a filter of the character stated, incorporating a simple and inexpensive, but highly effective filter cartridge which is durable and long lived, and which may be replaced from time to time with a minimum of labor and inconvenience.

Another object of the invention is to provide a filter which will entrap foreign particles and remove them from the oil or other viscous fluid, with a degree of efficiency heretofore not attained in devices heretofore proposed for the same purpose.

The foregoing and other objects are attained by the means described herein and illustrated in the accompanying drawings, in which.

It has been common practice heretofore, to interpose in the lubricating system of engines and other machinery, various types of filters to cleanse and remove sediment from the lubricant of the engines or machines, but to date such filters have been of questionable efficiency in the performance of their intended function. In many instances, the filters would readily clog and stop the flow of lubricant to the engine or a machine, while in other instances the clogging resulted in merely by-passing the lubricant either within the filter or at some exterior location, without removal of dirt, sediment, and foreign particles from the lubricant. In other cases the lubricant was forced under relatively high pressure through the screening materials of the cartridge, resulting either in gradual deterioration or perforation of the screening materials, or in splitting or bursting thereof, so that the filter was thereafter rendered ineffective for its intended function. In still other cases, the filter devices were so complex in design, as to render them prohibitive in cost and in maintenance expense, often with the added disadvantage that the cartridges were replaced with difficulty, and sometimes at very frequent intervals.

The present filter is so constructed as to obviate all of the disadvantages mentioned, while at the same time enhancing the efficiency thereof and reducing to a minimum the labor and expense of cartridge replacements. Other advantages will appear and become evident as the description of the device proceeds.

Figure 1:
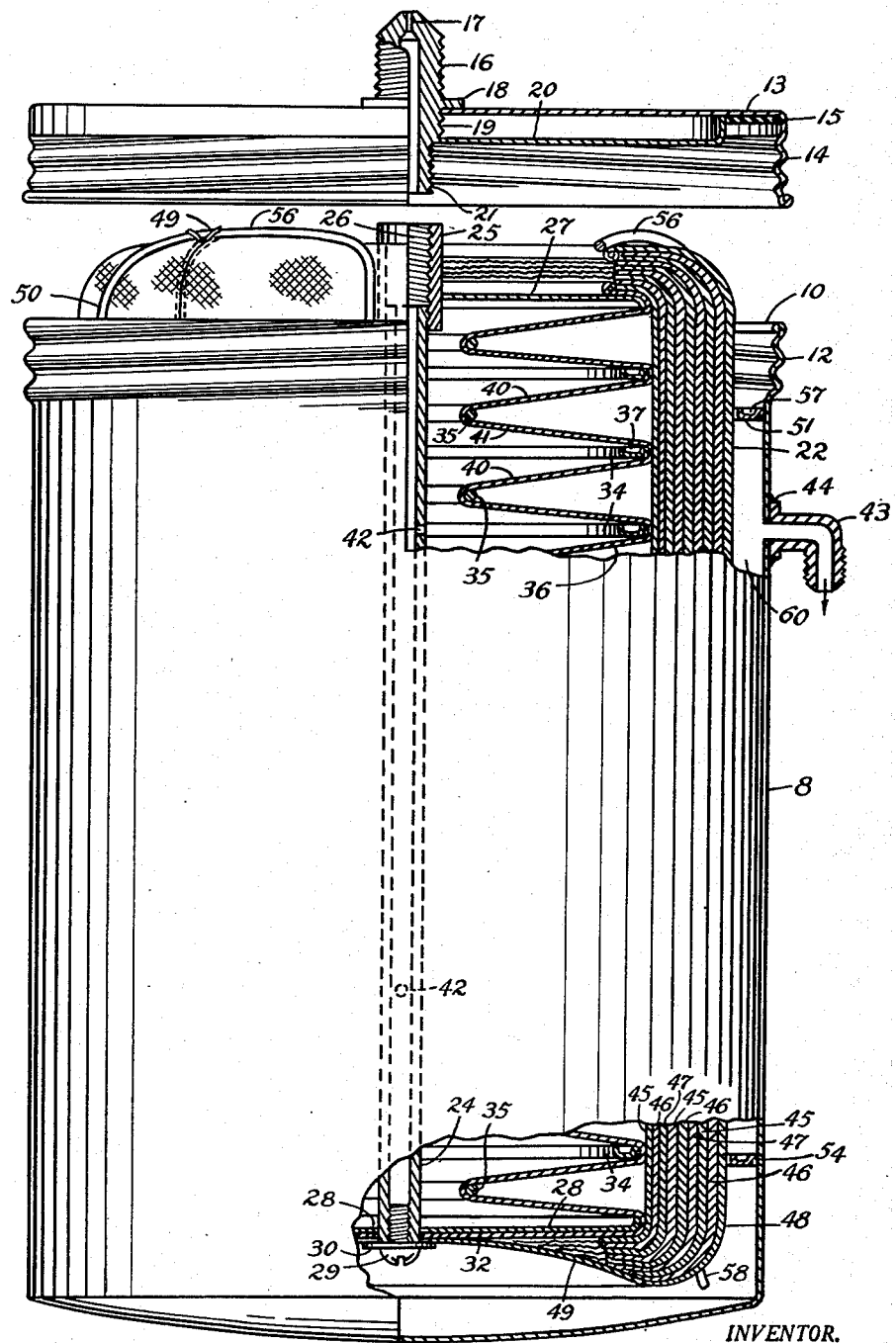
Fig. 1 is a side elevational view of the improved filter device, with the cap or cover shown in a detached and slightly lifted position, parts being broken away to show the interior construction in cross-section.

Referring to the accompanying drawing, Fig. 1, 8 indicates a can or container of metal or other suitable material which is adapted to house the filter cartridge. The container preferably is cylindrical in shape, and has a bottom wall 9 which is preferably made convex as shown, so that it may serve as a sump or trap for any residual sediment or foreign materials such as water, dirt or the like. The rim portion 10 of the container is annular in shape, and will preferably be furnished with screw threads 12 or other suitable means for the attachment of a cap or cover 13 which closes the container at its upper end. The cap or cover may be furnished with complementary screw threads 14 to engage the threads 12 of the container. A sealing gasket 15 may be applied interiorly of the cover for effecting a fluid-tight connection between the lid and the container.

As a means of introducing lubricant into the filter, the cover may be provided centrally thereof with inlet fitting 16 having a constricted inlet port 17 therein to substantially reduce the pressure of fluid entering the filter. A flange 18 on the fitting may be soldered, brazed, or otherwise fixedly secured to the cover, so that the fitting may not rotate relative thereto. If necessary or desirable, the fitting may be furnished with threads 19 beneath the flange, to engage complementary threads furnished in a cover reinforcing plate 20, thereby adding to the durability and rigidity of the assembly. A reduced threaded end 21 of the fitting furnishes means whereby the filter cartridge may be detachably suspended from the fitting, as will more clearly be explained hereafter.

The replaceable cartridge for the filter comprises two assembled parts illustrated by Figs.

2 and 3. The part 22 of Fig. 2 may be referred to as the secondary outer screen assembly in which is incorporated the primary inner screen assembly indicated at 23 of Fig. 3. These parts are shown in their assembled condition upon Fig. 1 of the drawing.

The cartridge member referred to as the primary inner screen assembly 23, consists of a central tube 24 extending substantially the full length of the primary screen assembly, said tube being furnished at its upper end with a detachment coupler 25 which is in the form of a sleeve internally threaded at 26 to accommodate the threads 21 at the lower end of the cover fitting 16. Coupler 25 is securely fixed to the upper end of tube 24, and carries an upper disc or plate 27 of metal or other solid impervious material. A similar impervious disc or plate 28 of equal size is applied to the lower end of the tube, and may be held in place thereon by means of a screw plug 29 and washer 30, the screw plug being threadedly introduced into the lower internally threaded end of the tube.

The rigid assembly comprising the tube 24, coupler 25, and discs 27 and 28, is adapted to be substantially encased by means of a woven fabric sock 31 which is cylindrical in cross-section, and provided with a fabric bottom end piece 32 to cover the plate 28, the end piece being penetrated by the screw plug 29. At its upper end, the sock may be hemmed annularly and provided with a draw-string 33 for firmly pulling the upper end of the sock inwardly over the outer margin of the top plate or disc 27.

Figure 3:
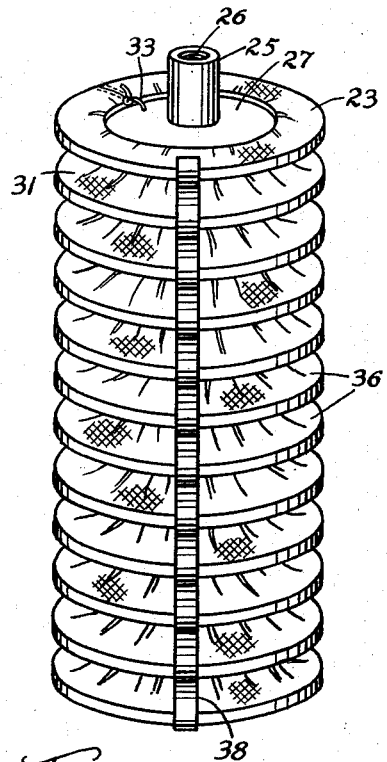
Fig. 3 is a perspective view of a primary inner screen assembly which forms part of the filter cartridge.
Figure 4:
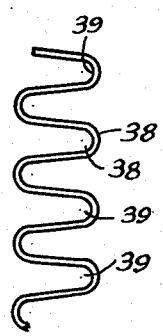
Fig. 4 is a fragmental elevational view on an enlarged scale, showing a pleat spacer for the primary screen assembly of Fig. 3.
Figure 5:
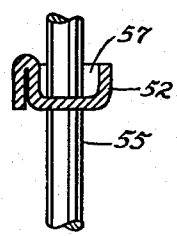
Fig. 5 is an enlarged fragmental cross-section view taken on line 5—5 of Fig. 2.

As will readily be evident by referring to Figs. 1 and 3, the sock of strong woven fabric is given an accordion or bellows-like contour, using for this purpose certain means about to be described, so that it may be appreciated that the sock initially is much longer than the tube 24 prior to application of the sock to the rigid parts of the primary inner screen assembly composed of the tube, the pleats, and the coupler 25. To produce the accordion pleat or bellows effect of the sock 31, there is introduced into the sock a series of annular rigid rings 34 of substantially the same diameter as plates 27 and 28, alternated with a series of smaller rigid rings 35 which surround the central tube 24 in spaced relation. The larger rings 34 may be referred to as expansion rings, as they maintain the sock expanded at intervals along its length. The smaller rings 35 may properly be referred to as contraction rings, since they maintain intermediate portions of the sock in a contracted or constricted condition. The rings may be of any suitable rigid material, preferably metal. As may be most clearly understood by referring to Fig. 1, the expansion rings 34 preferably are made U-shape in cross-section, so as to furnish a series of sediment troughs 37 at the outermost ends of the pleats, the pleats being indicated by the characters 36. By utilizing a sufficient number of expansion and contraction rings in alternation, a considerable number of pleats may be provided along the full length of the primary inner screen assembly. The expansion rings, as will be observed, are located within the sock, whereas the contraction rings 35 are applied exteriorly of the sock and between adjacent expansion rings. With all of the rings in place, the draw-string 33 may be pulled tight and knotted as at 33, to maintain a taut condition of the pleats at all times. In order to establish substantial uniformity in the spaces between adjacent pleats, one or more pleat spacers 38 may be applied exteriorly of the assembly as illustrated upon Fig. 3. Each pleat spacer may consist of a ribbon of metal or other substantially rigid material bent in serpentine fashion as illustrated upon Fig. 4, so that alternate pockets 39 thereof will accommodate and maintain a spaced relationship of adjacent pleats. The pleat spacers will preferably be so formed as to snugly embrace the contraction rings 34 and their sock covering.

By referring to Fig. 1, it will be noted that each pleat of the primary screen assembly presents a slightly inclined floor surface 40 upon which may settle any impurities or foreign materials introduced into the filter along with the lubricant. Each floor surface will be overhung by a similar ceiling surface 41 disposed at a reversed inclination, with the surfaces 40 and 41 gradually diminishing in spaced relationship in the direction of the expansion rings 34. Thus it will be evident that the floor surfaces 40 of all the pleats will accumulate most of the foreign particles or substances carried by the lubricant in passing through the pleats from the inside toward the outside of the primary screen assembly, leaving the ceiling surfaces 41 relatively unobstructed for the passage of lubricant during the filtering process. Foreign particles or substances reaching the ceiling areas as the lubricant passes therethrough, will tend to drop onto the floor areas 40, leaving the ceiling areas always free for the passage of lubricant.

Lubricant is conveyed to the interior of the primary inner screen assembly by means of the central tube 24, which along its length may be furnished with a series of small openings 42 arranged at different elevations. Oil leaving the openings 42 passes through the pleats of the primary inner screen assembly, then penetrates the secondary or outer screen assembly 22, and finally occupies the space within the container 8 around the cartridge, from which space the cleansed oil will flow by way of the outlet fitting 43. The outlet fitting may be located at an elevation upon the container 8, and may be soldered, brazed, or otherwise fixed thereto as indicated at 44.

Figure 2:
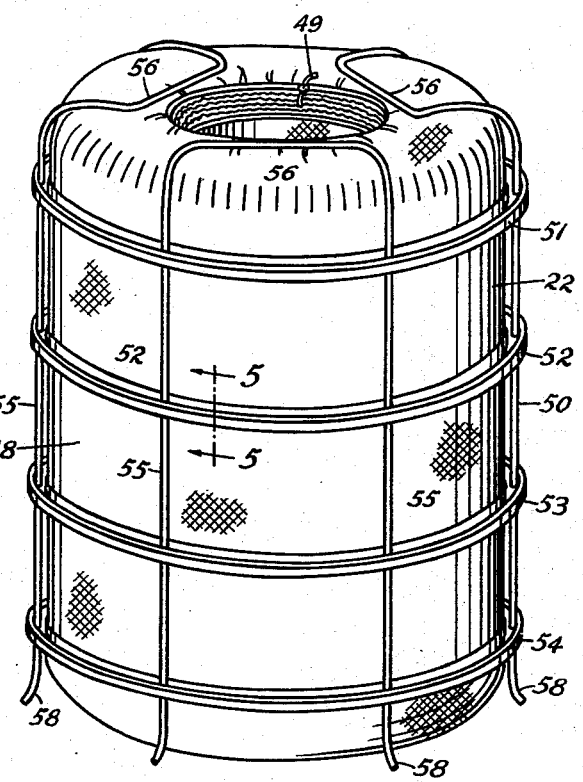
Fig. 2 is a perspective view of a secondary outer screen assembly which forms part of a replaceable filter cartridge.

The secondary or outer screen assembly 22, which is shown in perspective upon Fig. 2, consists of a multiplicity of layers or sheets of different types of fabric rolled tightly to cylindrical formation about the primary screen assembly of Fig. 3. In other words, the structure of Fig. 2 in the preferred form of cartridge, will not be separable from the assembly of Fig. 3 which is located within the secondary outer screen assembly. In forming up the cartridge, the assembly of Fig. 3 is used as a mandrel onto which are wound, in alternation, strips of cheese cloth, muslin or other coarsely woven material, strips of felt or matted fiber material, and strips of Canton flannel or similar fleecy material, until the desired diameter of the secondary or outer screen assembly is attained. Thus, by referring to Fig. 1, it may be assumed that the layers or sheets 45 are of cheese cloth, muslin or other coarsely woven material; those at 46 being of Canton flannel or similar fleecy material, and those at 47 being of felt or matted fiber material, these layers or sheets being arranged in alternation. It is preferred that a greater number of layers or sheets be employed than is possible to show upon the accompanying drawing, and the number of sheets of different types of fabric will depend largely upon the size to which the structure of Fig. 2 is to be built up, within the limits imposed by the diameter of the can or container 8. After the required number of filter sheets or strips have been applied about the assembly of Fig. 3, the entire filter cartridge is to be inserted into a final covering member in the form of a sock 48 having a bottom 49 which conceals the sock 32 and plate 28 at the lower end of the cartridge. The screw plug 29 passes through both sock bottoms 32 and 49, as illustrated by Fig. 1. The upper end of the sock 48 may be hemmed and furnished with a draw-string 49 in substantially the manner previously explained in connection with Fig. 3, for drawing the sock 48 tightly about all of the layers or sheets wound upon the primary screen assembly. Thereafter, the cartridge may be inserted into a metallic cage 50 which serves as a protector and as a means of spacing the cartridge uniformly from the inner surfaces of the container walls 8.

The cage may consist of a series of annular members or rings 51, 52, 53 and 54 arranged at different elevations along the height of the cartridge, said rings being spaced apart at intervals by means of the upright wires or other rigid members 55, to which the rings are soldered or otherwise affixed. At their upper ends, the wires may include loops 56 turned inwardly over the top of the cartridge so as to limit insertion of the cartridge. The loops, moreover, furnish substantial bearing surfaces at the top of the cartridge, serving to prevent the cover reinforcing disc 20 from contacting the fabric of the cartridge, and possibly chafing it when the cartridge is screwed onto the lid fitting at the coupler 25. In the preferred form of the cage, the annular rings are made substantially U-shape in cross-section so as to furnish troughs 57 capable of entrapping any residual sediment that might possibly remain in the lubricant after having passed through the filter cartridge. Under ordinary circumstances, no such residual settlement will occur within the filter can or container exteriorly of the cartridge, unless by reason of accidental tearing or deterioration of the cartridge material. It should be considered, therefore, that the troughs indicated at 57 are provided principally as a safety feature in connection with the filter. The lower ends of the wires or uprights 55 may be turned outwardly as indicated at 58, to furnish a throat facilitating insertion of the cartridge into the protective cage.

When the cartridge is applied tightly to the cover fitting at the coupling means 21—25, the cover and the cartridge constitute a unitary structure, so that the cartridge may be removed by simply unscrewing the cover from the container 8. In the completely assembled condition of the filter, the upper edge or rim 10 of the container will seat firmly upon the cover gasket 15, and the lower ends 58 of the cage structure will be maintained in an elevated position relative to the bottom 9 of the can or container. It will accordingly be understood that the entire filter cartridge is normally suspended from the cover, in spaced relationship with the bottom and the side wall of the container. The loops at 56 will contact the reinforcing disc 20 of the cover, thereby precluding all possibility of the cartridge to vibrate within the can or container 8, and thereby tend to loosen the connections at 18, 19 and 26.

In the operation of the device, the fitting 16 is connected to the oil line of an engine or machine, and through the constricted orifice 17 of the fitting, a very limited flow of lubricant is permitted to pass into the upright tube 24. The lubricant may escape only through the openings 42 of the tube, in order to enter the interior of the primary inner screen assembly. As the lubricant seeps through the fabric of the accordion pleats, any sediment removed by the material of the pleats is accumulated upon the floor areas 40 throughout the length of the primary screen assembly. It will be noted that the screening areas 40 and 41 are quite extensive, and for that reason will permit a relatively free flow of lubricant therethrough. The lubricant passing through the areas 40 and 41 is then required to pass through the layers of cheese cloth, felt, and Canton flannel which constitute the secondary screen assembly, and by the time the lubricant so passes through the secondary screen assembly it will be thoroughly cleansed of dirt and all other foreign particles. As the level of oil released through the secondary screen assembly builds up within the chamber 60 of the container, it will eventually overflow through the outlet fitting 43, from which it will be piped and returned to the engine or machine from which it was originally obtained before entering the filter. In the course of time, the troughs 37 and 57 may accumulate a portion of the sediment or foreign particles.

It is important to note that the outlet fitting 43 is placed at an elevation such that the cartridge is kept practically submerged in oil at all times. The purpose of this is to prevent agitation or any disturbance within the filter, such as might interfere with the tendency of foreign particles and sedimentary material to settle out and separate from the oil; and the natural tendency to settle is enhanced also by the fact that no perceptible flow of oil through the filter is permitted, due to the small size of the inlet orifice 17, and the relatively larger size of outlet 43. In practice, the best results are obtainable by gauging the orifice 17 to pass about three gallons of oil per hour, which is slow enough to ensure free gravitation of foreign particles so that they cannot be carried over with the filtered oil leaving the discharge outlet 43. It will be noted that the discharge outlet is made much larger than the inlet orifice 17, so that no pressure or velocity flow of oil can occur within the filter to disturb the desired gravitation and settling out of the foreign particles or sedimentary materials.

After the filter has been in use for an extended period of time, it may be considered desirable to remove the cartridge. To effect the removal, it is necessary only to disconnect the oil feed line from fitting 16, and then unscrew the cover 13 from the can or container 8. Lifting of the cover from the container will also lift the cartridge with its cage attached, and upon complete removal of the cartridge, it may be unscrewed from the cover at the coupling 25. A fresh cartridge may then be applied to the cover, and the device assembled as heretofore explained, to again place the filter in operation. If necessary, the sump at the bottom of the container 8 may be swabbed out or otherwise cleared of any deposit that might possibly accumulate therein. The filter will be found to possess all of the advantages heretofore enumerated, as well as others which will be evident to persons skilled in the art to which the invention relates.

It is to be understood that various modifications and changes in the structural details of the device may be made, within the scope of the appended claims without departing from the spirit of the invention.

What is claimed is:

1. A filter comprising in combination, a container having a side wall, a bottom, and an upper rim providing an open end for the container, a cover detachably fitted to the rim for closing the open end of the container, a fitting fixed to the cover and including a constricted orifice to convey viscous material to the inside of the container, a filter cartridge including a coupler for detachably suspending the cartridge from the fitting of the cover, and into which the viscous material is fed by the orifice, a rigid cage spacing the cartridge from the inside of the container, said cage including upper end members to contact the inside of the cover and space the cartridge therefrom in a stabilized condition opposing vibration of the cartridge while suspended from the fitting, a series of horizontal annular sediment troughs located upon the cage at various elevations within the container, and means to release filtered viscous material from the container.

2. A filter comprising in combination, a container having a side wall, a bottom, and an upper rim providing an open end for the container, a cover detachably fitted onto the rim for closing the open end of the container, a longitudinally bored fitting fixed centrally to the cover with said bore constricted to reduce flow of viscous material therethrough toward the inside of the container, said fitting including a threaded depending end, a filter cartridge comprising a central rigid upright tube having a closed lower end and provided in its side wall with at least one lateral opening for release of viscous material fed into the upper end of the tube, a threaded coupler on the upper end of the tube for detachably suspending the tube from the threaded depending end of the cover fitting, an upper impervious disc fixed about the tube near its upper end, and a lower impervious disc fixed to the tube near its closed lower end, primary screening means in the form of accordion pleats spaced apart and interposed between said upper and lower discs, to furnish extensive filtering areas about the central tube, said primary screening means being in fixed relationship to the tube and the discs attached thereto, a secondary screening means in the form of a multiplicity of fabric sheets wound spirally about the pleats of the primary screening means, said fabric sheets being arranged as alternate layers of coarsely woven fabric, matted fiber material,-and a fleecy nap material, a fabric sock substantially surrounding the secondary screening means, the primary screening means, the tube, and the discs, and means to release filtered viscouse material from the container at an elevation above its bottom.

3. A filter comprising in combination, a container having a side wall, a bottom, and an upper rim providing an open end for the container, a cover detachably fitted onto the rim for closing the open end of the container, a longitudinally bored fitting fixed centrally to the cover with said bore constricted to reduce flow of viscous material therethrough toward the inside of the container, said fitting including a threaded depending end, a filter cartridge comprising a central rigid upright tube having a closed lower end and provided in its side wall with at least one lateral opening for release of viscous material fed into the upper end of the tube, a threaded coupler on the upper end of the tube for detachably suspending the tube from the threaded depending end of the cover fitting, an upper impervious disc fixed about the tube near its upper end, and a lower impervious disc fixed to the tube near its closed lower end, primary screening means in the form of accordion pleats spaced apart and interposed between said upper and lower discs, to furnish extensive filtering areas about the central tube, said primary screening means being in fixed relationship to the tube and the discs attached thereto, a secondary screening means in the form of a multiplicity of fabric sheets wound spirally about the pleats of the primary screening means, said fabric sheets being arranged as alternate layers of coarsely woven fabric, matted fiber material, and a fleecy nap material, a fabric stock substantially surrounding the secondary screening means, the primary screening means, the tube, and the discs, a rigid cage surrounding the sock and spacing the cartridge from the inside of the container, and means to release filtered viscous material from the container at an elevation above its bottom.

4. A filter comprising in combination, a container having a side wall, a bottom, and an upper rim providing an open end for the container, a cover detachably fitted onto the rim for closing the open end of the container, a longitudinally bored fitting fixed centrally to the cover with said bore constricted to reduce flow of viscous material therethrough toward the inside of the container, said fitting including a threaded depending end, a filter cartridge comprising a central rigid upright tube having a closed lower end and provided in its side wall with at least one lateral opening for release of viscous material fed into the upper end of the tube, a threaded coupler on the upper end of the tube for detachably suspending the tube from the threaded depending end of the cover fitting, an upper impervious disc fixed about the tube near its upper end, and a lower impervious disc fixed to the tube near its closed lower end, primary screening means in the form of a porous sock having accordion pleats spaced apart and interposed between said upper and lower discs, to furnish extensive filtering areas about the central tube, said primary screening means being in fixed relationship to the tube and the discs attached thereto, a secondary screening means in the form of a multiplicity of fabric sheets wound spirally about the pleats of the primary screening means, a rigid cage surrounding the sock and spacing the cartridge from the inside of the container, said cage including upper end members to contact the inside of the cover at a distance from the cover fitting, thereby to stabilize the cartridge against vibration laterally upon the cover fitting, and means to release filtering viscous material from the container at an elevation above its bottom.

5. A filter cartridge comprising in combination, a central upright rigid tube having a closed lower end and an open upper end, said tube being apertured laterally intermediate its ends, a coupler at the upper end of the tube for detachable connection with a feed pipe for viscous material to be filtered, upper and lower impervious discs fixed relative to the tube in spaced parallelism, a pervious fabric sock spanning the discs and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, and a multiplicity of fabric sheets wound spirally about the pleated sock to cylindrical formation, said fabric sheets being arranged as alternate layers of coarsely woven fabric, matted fiber material, and a fleecy nap material.

6. A filter cartridge comprising in combination, a central upright rigid tube having a closed lower end and an open upper end, said tube being apertured laterally intermediate its ends, a coupler at the upper end of the tube for detachable connection with a feed pipe for viscous material to be filtered, upper and lower impervious discs fixed relative to the tube in spaced parallelism, a pervious fabric sock spanning the discs and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, a multiplicity of fabric sheets wound spirally about the pleated sock to cylindrical formation, said fabric sheets being arranged as alternate layers of coarsely woven fabric, matted fiber material, and a fleecy nap material, and a second pervious fabric sock substantially enclosing the fabric sheets aforesaid, the tube, the discs, the rings, and the fabric sock first mentioned.

7. A filter cartridge comprising in combination, a central upright rigid tube having a closed lower end and an open upper end, said tube being apertured laterally intermediate its ends, a coupler at the upper end of the tube for detachable connection with a feed pipe for viscous material to be filtered, upper and lower impervious discs fixed relative to the tube in spaced parallelism, a pervious fabric sock spanning the discs and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, a multiplicity of fabric sheets wound spirally about the pleated sock to cylindrical formation, said fabric sheets being arranged as alternate layers of coarsely woven fabric, matted fiber material, and a fleecy nap material, and a second pervious fabric sock substantially enclosing the fabric aforesaid, the tube, the discs, the rings, and the fabric sock first mentioned, both of said socks being fixed to the closed lower end of the tube.

8. A filter cartridge comprising in combination, a central upright rigid tube having a closed lower end and an open upper end, said tube being apertured laterally intermediate its ends, a coupler at the upper end of the tube for detachable suspension of the cartridge from a feed pipe for viscous material to be filtered, upper and lower impervious discs fixed relative to the tube in spaced parallelism, a pervious fabric sock extending continuously from one disc to the other and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, the expansion rings being channel-shaped in cross-section and open at the top to receive and hold solid material separated from the viscous material, and a multiplicity of fabric sheets wound about the pleated sock to cylindrical formation.

9. A filter cartridge comprising in combination, a central upright rigid tube having a closed lower end and an open upper end, said tube being apertured laterally intermediate its ends, a coupler at the upper end of the tube for detachable suspension of the cartridge from a feed pipe for viscous material to be filtered, upper and lower impervious discs fixed relative to the tube in spaced parallelism, a pervious fabric sock extending continuously from one disc to the other and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, the expansion rings being channel-shaped in cross-section and open at the top to receive and hold solid material separated from the viscous material, and a multiplicity of fabric sheets wound about the pleated sock to cylindrical formation, said fabric sheets being arranged as alternate layers of coarsely woven fabric, matted fiber material, and a fleecy nap material.

10. A filter cartridge comprising in combination, a central upright rigid tube having a closed lower and an open upper end, said tube being apertured laterally intermediate its ends, a coupler at the upper end of the tube for detachably suspending the cartridge from a feed pipe for viscous material to be filtered, upper and lower impervious discs fixed relative to the tube in spaced parallelism, a pervious fabric sock extending from one disc to the other and providing a closed chamber to which viscous material initially is fed through the lateral aperture of the tube, means maintaining an accordion pleated condition of the sock, comprising a series of large expansion rings within the sock, and a series of relatively small contraction rings placed exteriorly of the sock in alternation with the expansion rings, a multiplicity of fabric sheets covering the pleated sock, and a cage circumscribing the last mentioned fabric sheets, the cage including sediment traps in the form of substantially horizontal channel-shaped rings open at the top and snugly embracing said fabric sheets.

HERMAN W. BAHLKE.

REFERENCES CITED

The following references are of record in the file of this patent:

UNITED STATES PATENTS

| Number | Name | Date |
|---|---|---|
| Re. 11,805 | Watson et al. | Jan. 23, 1900 |
| 1,539,910 | Parish | June 2, 1925 |
| 1,547,246 | Weaver | July 28, 1925 |
| 1,585,246 | Hoy | May 18, 1926 |
| 1,607,027 | Wall | Nov. 10, 1926 |
| 1,830,742 | McKinley | Nov. 3, 1931 |
| 1,937,415 | Sidney | Nov. 28, 1933 |
| 2,218,800 | Williams | Oct. 22, 1940 |
| 2,284,447 | Redner | May 26, 1942 |

FOREIGN PATENTS

| Number | Country | Date |
|---|---|---|
| 15,354 | Great Britain | 1896 |

Certificate of Correction

Patent No. 2,463,137.                                                                                     March 1, 1949.

HERMAN W. BAHLKE

It is hereby certified that errors appear in the printed specification of the above numbered patent requiring correction as follows:

Column 8, line 14, claim 3, for the word "stock" read *sock*; line 57, claim 4, for "filtering" read *filtered*;

and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*